Dec. 15, 1970    YIN-LUNG YANG    3,546,906
SAFETY LOCK
Filed July 20, 1967    7 Sheets-Sheet 1
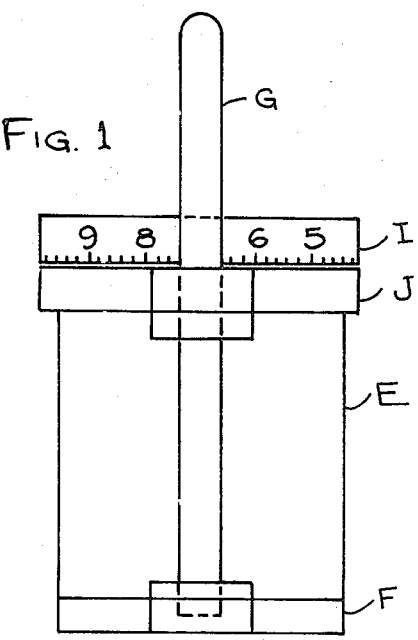
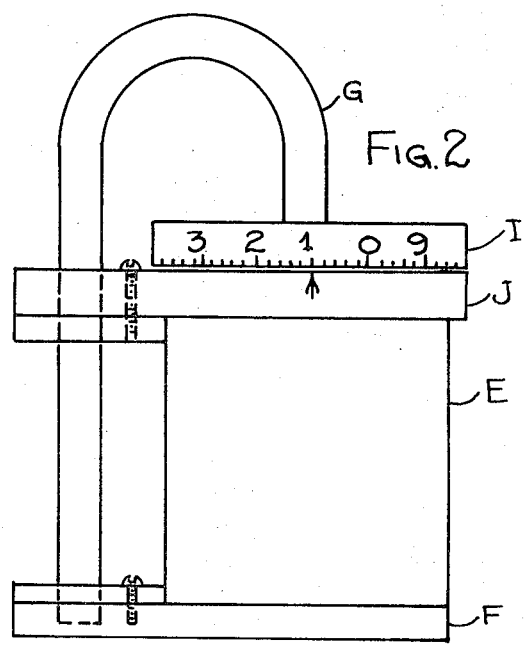
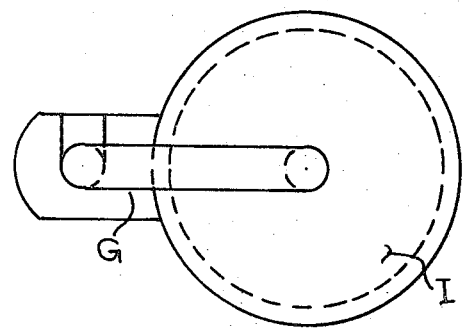
INVENTOR.
YIN-LUNG YANG
BY Max Wall

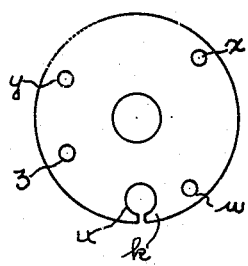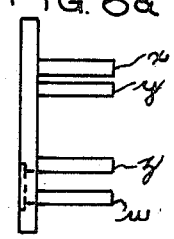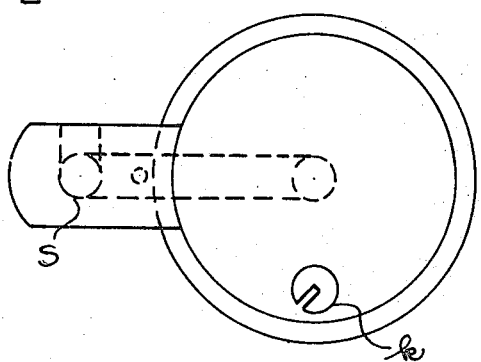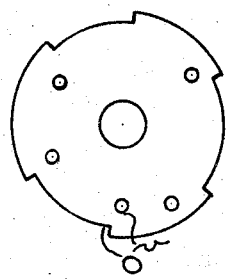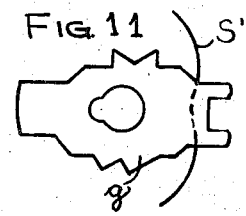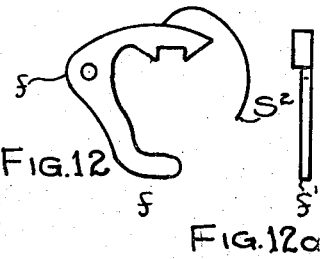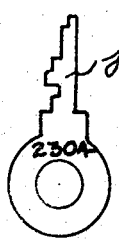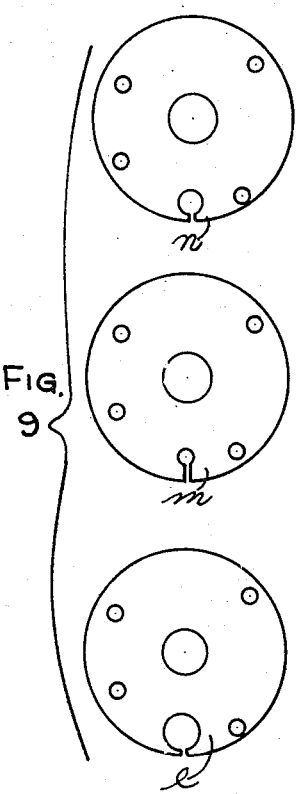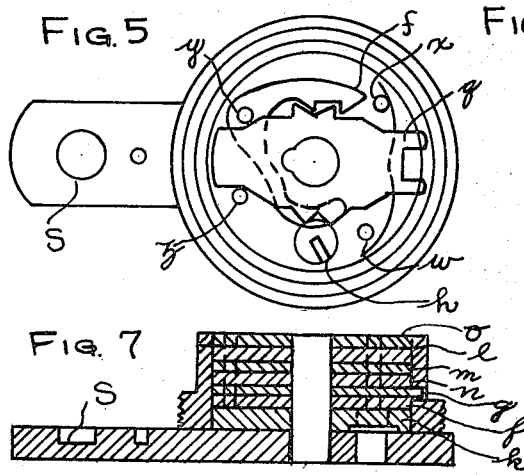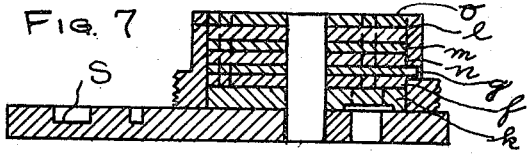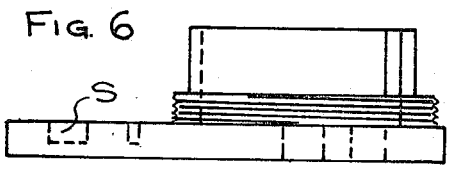

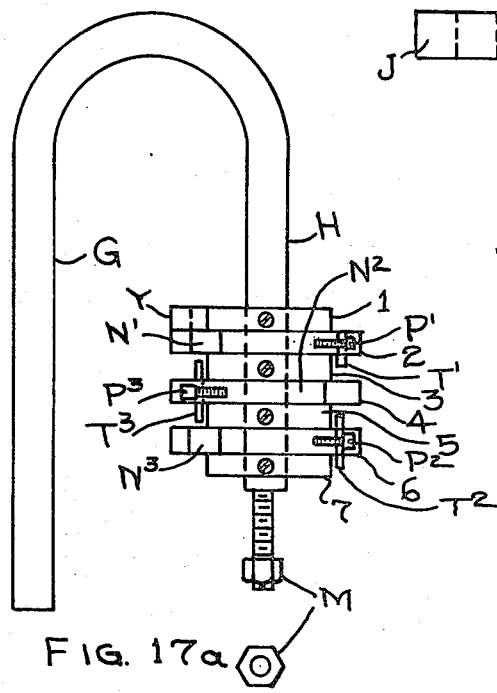
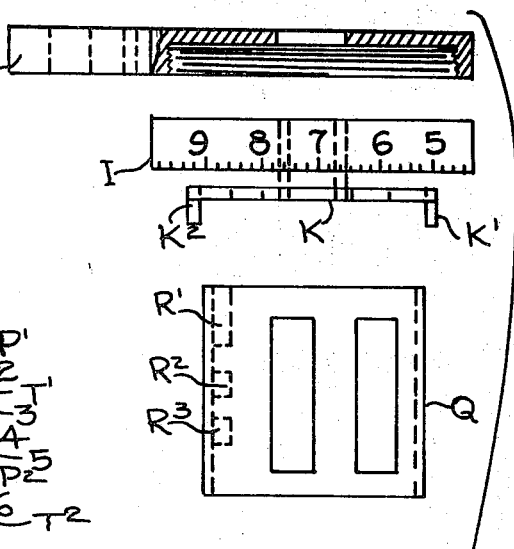
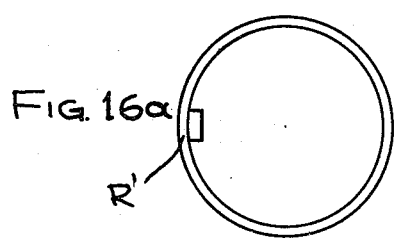
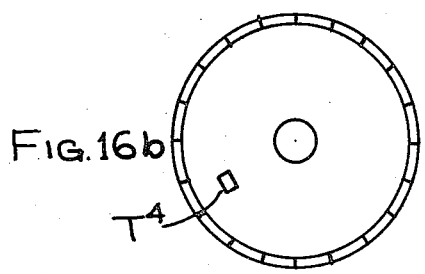
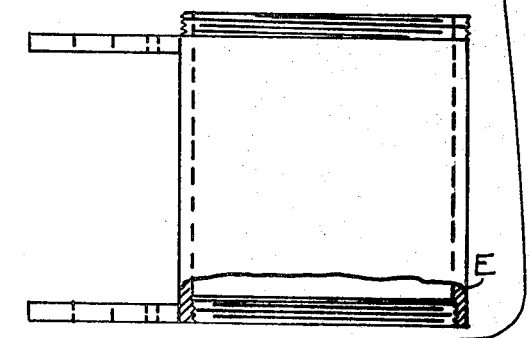
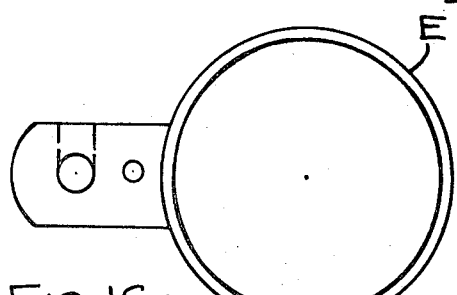

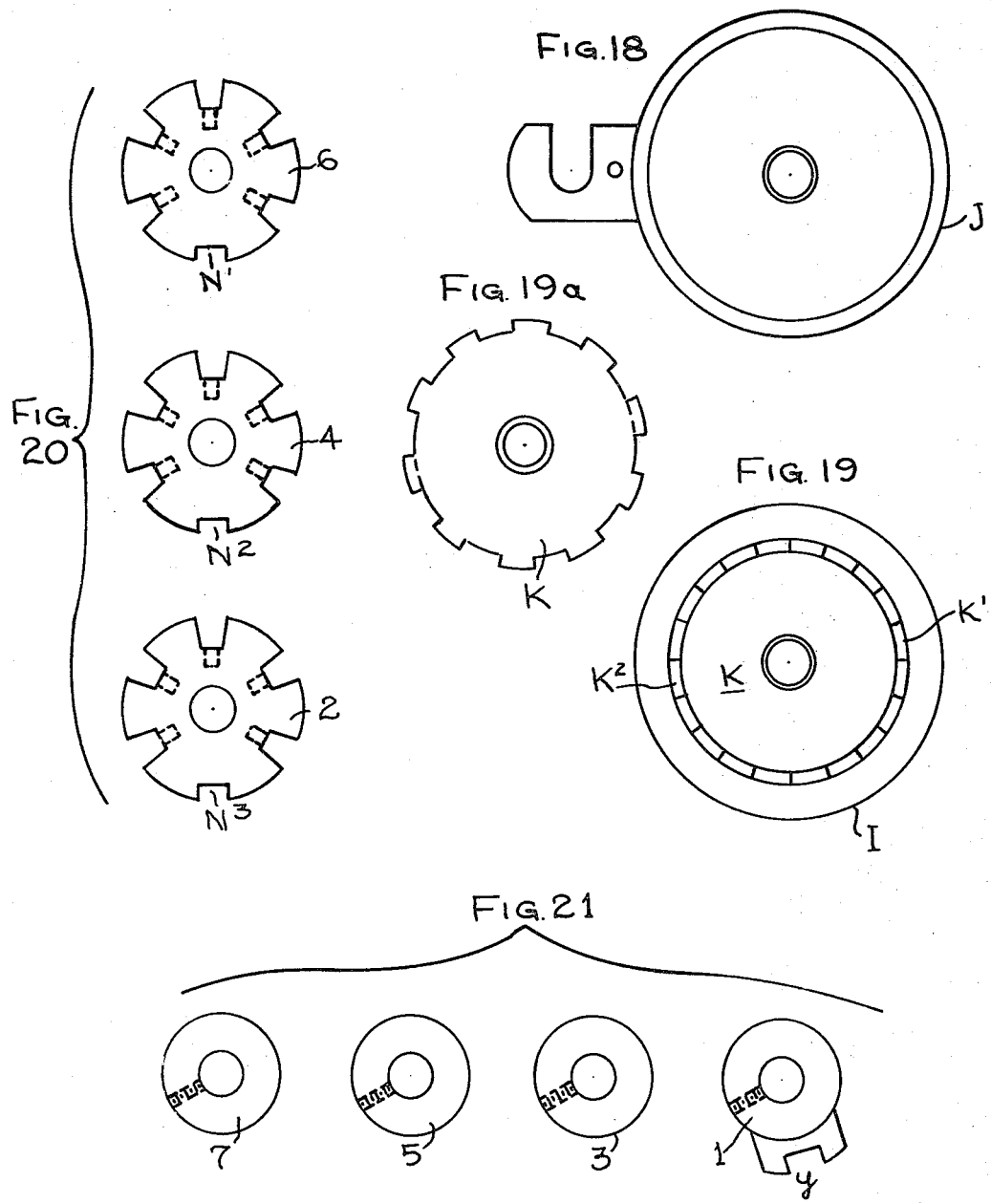

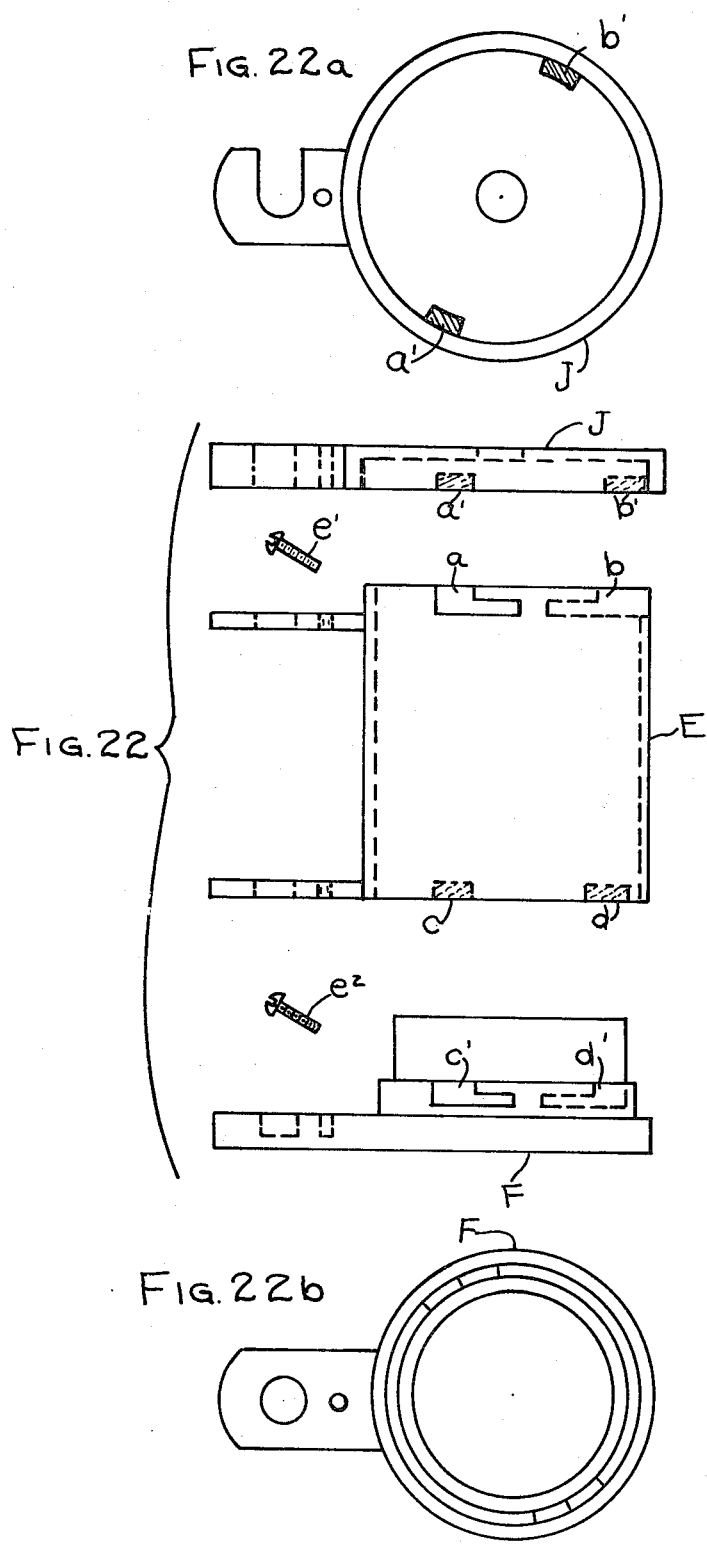

Dec. 15, 1970 YIN-LUNG YANG 3,546,906
SAFETY LOCK

Filed July 20, 1967 7 Sheets-Sheet 6

INVENTOR.
YIN-LUNG YANG
BY Max Wall

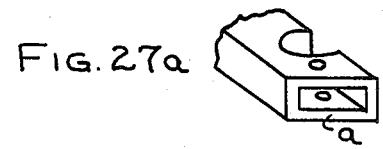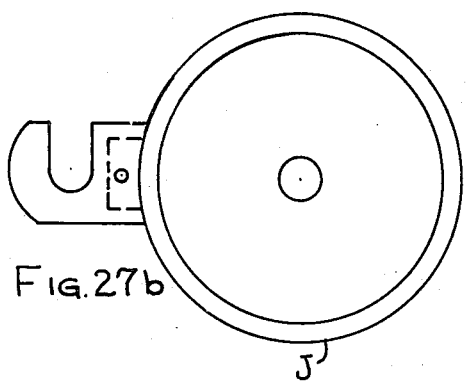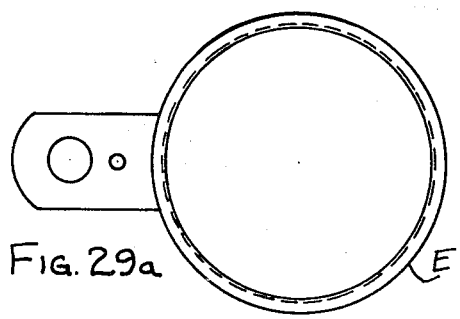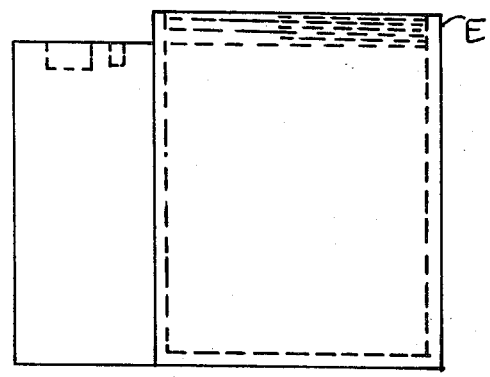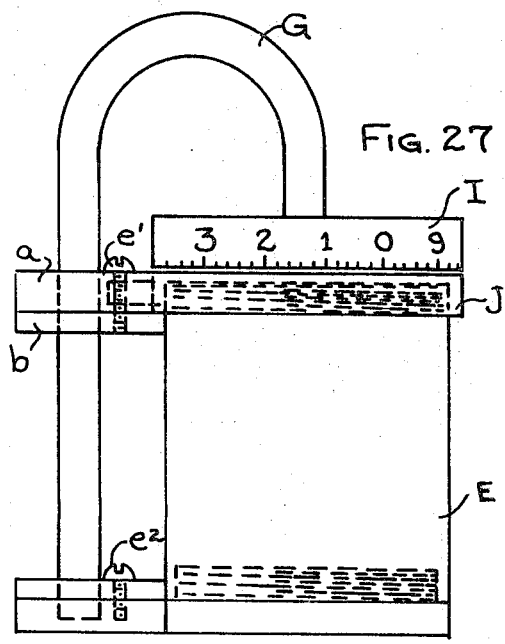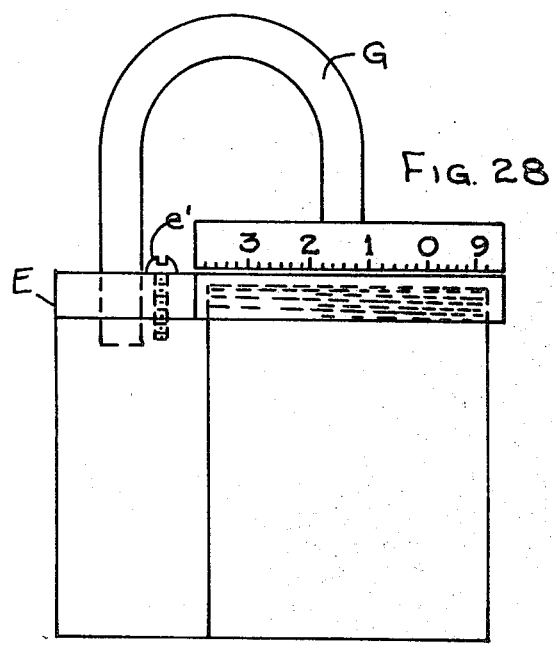

United States Patent Office 3,546,906
Patented Dec. 15, 1970

3,546,906
SAFETY LOCK
Yin-Lung Yang, 21–9 Chih Yung Village,
Kangshan, Taiwan
Filed July 20, 1967, Ser. No. 654,764
Int. Cl. E05b 37/06, 37/08
U.S. Cl. 70—21                                    10 Claims

ABSTRACT OF THE DISCLOSURE

A padlock, which embodies both a variable key-operated device and a variable permutation-operated device independently within a lock. The lock can be locked either by one of the devices or by both of the devices. The lock can be unlocked by a coded key alone only when the variable permutation-operated device is in its unlocked position. Likewise the lock can be unlocked by the combination alone only when the key-operated device is in its unlocked position. When the devices are both in the locked position, the lock can be unlocked only when those who know the combination of the permutation-operated device as well as having possession of a coded key. Means are provided for varying either one or both of the devices by the owner of the lock, and make the original coded key or the combination inoperative to the said lock, hence a new coded key or a new combination or both of them are necessary to be used.

---

This invention relates in general to locks, and more particularly to an improved padlock construction incorporating both combination and key-actuated mechanisms.

Attempts are often made, in picking a lock, to fit a key to the lock or to determine the position of the notches in the permutation disks by unauthorized persons. Lock make of single key-operated device or permutation-operated device, or lock having both key-operated device and permutation-operated device which may be unlocked by either one of them, may be picked by a person attempting the unauthorized opening if he were able to open it only with either one of the said attempts. Likewise the keys given to the users of the lock are frequently lost, and the setting of combinations of the permutation device are often learned by someone cognizant of the users, so that those who find the lost key or learned the combination may also be able to open the lock easily. To prevent such an occurrence, the improvements in locks of my invention becomes apparently important, and add security against unauthorized opening of the lock.

As above noted, an important object of the present invention is more particularly concerned with the security or safety of a lock by locking the lock with both locking devices at the same time or varying either one or both of the devices.

Another object is to provide an improved padlock which may be selectively locked by means of either one of the devices, when it is preferred for the sake of convenience.

Still another object of the invention is to provide simple means for varying the combination of the permutation-operated device as well as the key-operated device individually or simultaneously without additional parts.

Still another object of the invention is to provide in a permutation lock of dial type the combination can be easily checked or renewed as long as the lock is in its unlocked position, no matter how long the lock has not been used or the combination has been forgotten, hence no need to look up on the records, because simple means for inspection the correct combination is provided thereon.

Still another object of the invention is to provide such a lock in which the key-operated device indicates the relative coded-key required for the operation of the device.

Still another object of the invention is to provide such a lock to facilitate in assembly or disassembly as well as replacement of any worn parts by unskilled user and need not be sent to the locksmith for repairment, because there is no riveted or fixed parts in the lock, hence no special technique is required.

Thus, it will be seen that there has been provided in this invention a construction in which the various objects above noted, together with many thoroughly practical advantages are achieved, and yet may be manufactured at a relatively low cost, because the structure of this invention is mainly and simply made of several circular disks and cylinders.

Other objects and advantages will become apparent from the following description taken in connection with the accompanying drawing, in which:

FIG. 1 is a vertical front view of a lock embodying the features of the invention.

FIG. 2 is a side view of a lock.

FIG. 3 is a top plan view of a lock.

FIG. 4 is a bottom plan view of a lock.

FIG. 5 is a fragmentary view with a section taken transversely through the lower end of the lock body to show the operative relationship of certain parts of the key-operated mechanism in the unlocked position.

FIG. 6 is a side view of FIG. 5.

FIG. 7 is a side sectional view of FIG. 5.

FIG. 8 is a top plan view of the mounting plate k in FIG. 7.

FIG. 8a is a side view of FIG. 8.

FIG. 9 is a top plan view of the intermediate plates n, m, l in FIG. 7.

FIG. 10 is a top plan view of the top plate o in FIG. 7.

FIG. 11 is a top plan view of the locking plate g in FIG. 7.

FIG. 12 is a top plan view of the hook f in FIG. 7.

FIG. 12a is a side view of FIG. 12.

FIG. 13 is a key receiving guide of the lock, h is its bottom plan view, and h' is its side view.

FIG. 14 and FIG. 15 are the views of the different coded keys.

FIG. 16 are the side views of various parts of the lock:

J is the removable top cap of the lock,
I is the rotatable dial of the lock,
K is the transfer disk of the lock,
Q is the permutation disks locking cylinder,
L is the permutation disks driving cylinder, and
E is the casing of the lock.

FIG. 16a is the top plan view of Q in FIG. 16.
FIG. 16b is the top plan view of L in FIG. 16.
FIG. 16c is the bottom plan view of E in FIG. 16.
FIG. 17 is a side view of the shackle.

G is the arm of the shackle,
H is the assembly of the permutation disks mounted on the other arm of the shackle.

FIG. 17a is a bottom plan view of the notch adjusting nut (see M in FIG. 17).
FIG. 18 is a bottom plan view of the cap J in FIG. 16.
FIG. 19 is a bottom plan view showing the transfer disk mounted together with the dial.
FIG. 19a is a top plan view of transfer disk K.
FIG. 20 is a top plan view of the permutation disks (2, 4, 6 in FIG. 17).
FIG. 21 is a top plan view of the spacing washers (1, 3, 5, 7, in FIG. 17).
FIG. 22 is a side view of the cap J, casing E and bottom F of the lock.
FIG. 22a is the bottom plan view of the cap J.
FIG. 22b is the top plan view of the bottom F key-operated mechanism being removed.
FIGS. 23, 24, 25, 26 are the side view, top plan view, front view and the bottom plan view respectively of the type B safety lock.
FIGS. 27, 27a, 27b indicate the different installations of the cap and the casing of the type A lock from the type B lock of FIGS. 28, 29, 29a.

Figure 25:
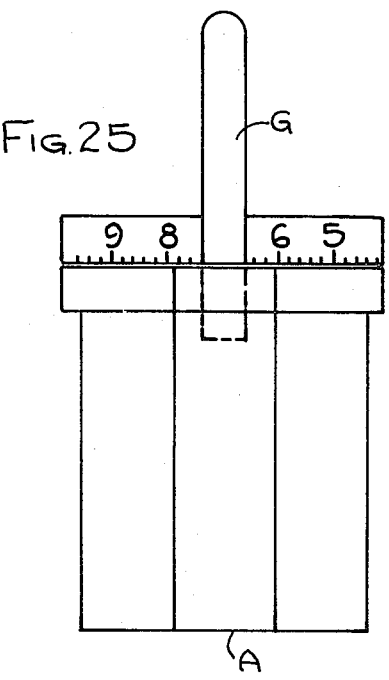
Figure 23:
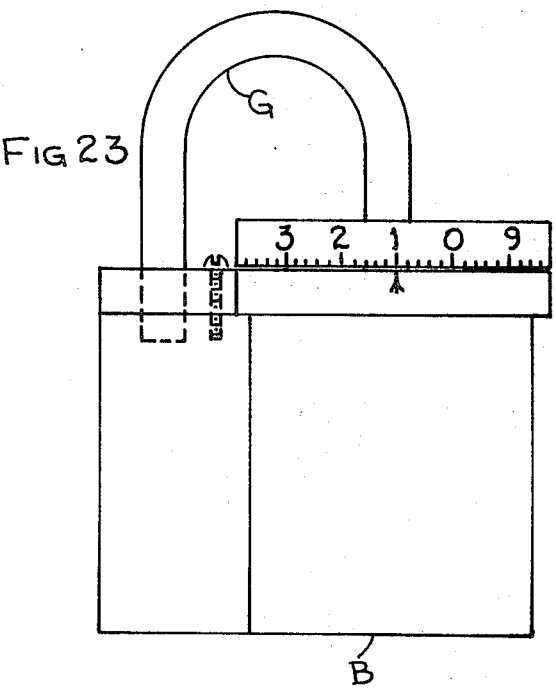
Figure 26:
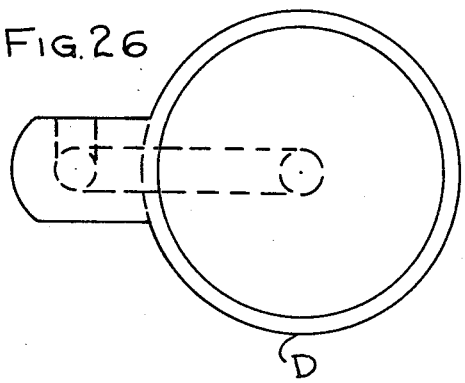
Figure 24:
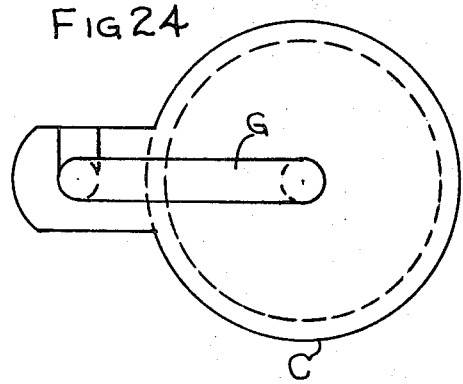

The present embodiment of the invention is in the form of a padlock and comprises in general a casing E, a shackle G having its arms extending into the casing and a dial I on the top of the cap J. The dial has a series of characters marked on its periphery, and a fixed mark is placed on the side wall of the cap J to cooperate with the characters on the dial. The cap J and the bottom F are connected with the casing E by suitable means. The said cap and the bottom can be removed when the lock is in its unlocked position for disassembly or access to internal mechanism of the lock. The bottom may be formed integrally with the casing like in the type B lock (see FIGS. 23–26). A U-shape shackle G embodies two arms in parallel, one of the arms called centering arm slidably and rotatably extends into the lock body through the center opening in the dial and the cap, downwardly abut against the bottom F, is capable of being rotated about its longitudinal axis when the lock is unlocked and the parallel arm is slid out of the opening in the lug of the body. In type B lock the paralleled arm is shorter than the centering arm as shown at FIG. 23.

The assembly H of the permutation disks and the spacing washers as well as the notch adjusting nut M (see FIG. 17) are mounted at the lower end of the centering arm to hold the shackle in the locked position when the lock is locked as will be later described.

All parts and the body may be formed of bronze or any preferred type of non-corrosive metal. The invention comprises two major locking devices, one is known as key-operated device and the other is permutation-operated device. They will be described in details as follows:

As shown at FIG. 5 or FIG. 7 is the key-operated device which occupied the lower part of the lock body. It comprises five concentrical circular plates $k$, $l$, $n$, $o$, $m$, a locking plate $g$, and a hook $f$. They are different in thickness (better seen at FIG. 7), and can be interchanged in their mounting positions except the top plate $o$ and the mounting plate $k$, of course the locking plate $g$ and the hook $f$ must be mounted in such a manner, they abut against each other in the proper position to achieve a proper hooking action on the locking plate in the locked or unlocked positions.

Since those interchangable plates are difference in thickness as described, and the key receiving holes on those plates are different in diameters, it will be observed that interchanging the mounting position of those plates will have a result in using a different coded key contour. Certain numbers are given and marked on the face of those plates while zero is given to the locking plate and the hook. Thus the numerical code marked on the key, generally four digits, will represent the mounting order of the plates.

As shown at FIG. 8a there are four mounting studs $x$, $y$, $w$, $z$, screwed or formed integrally with the plate $k$. The studs are provided for mounting the plates $l$, $n$, $o$, $m$ and the hook $f$. A notch cut on the periphery of the plate $k$, when the plate $k$ together with the plates $l$, $m$, $o$, $n$ mounted thereon is installed into the cup of the bottom F, the notch meeting the protrusions or stops formed integrally at the inner side wall of the cup, thus preventing the above mentioned plates from turning or shifting out of their proper positions. At the rear side of the plate $k$, a recess is cut thereon (see $u$ at FIGS. 8 and 8a) for holding the key receiving guide $h$ in place. The guide has a flange at its one end to prevent it from dropping out of the receiving bore in the bottom F.

The top plate $o$, like the other plates, has four holes drilled thereon for mounting over the four studs on the mounting plate $k$ respectively. The upper face of the plate $o$ is located underneath and bearing against the bottom wall of the permutation-disk-driving cylinder L when they are assembled, and serves as a corer for the key-operated mechanisms. A hole $v$ drilled on the plate $o$ is provided for receiving the tip of a key and hold the key in its proper position when the said key is inserted through the key receiving guide as well as the holes of the plates.

The locking plate $g$ is freely mounted between any two of the plates $l$, $m$, $n$, $k$. One end of the plate lies between the two studs $y$ and $z$ (see FIG. 5) while the opposite fork-shaped end protrudes through the aperture cut in the side wall of the mounting cup of the bottom F. The aperture and the studs serve as a guide for longitudinal movement of the plate. A spring $S_1$ (see FIG. 11) clamped at the fork end of the said plate has a tendency urging the plate in the contracted or unlocked position. A V-shape hook bearing against the locking plate has a hole drilled at its elbow for mounting on the stud $y$ of the mounting plate $k$ and pivot about the stud $y$. A spring $S_2$ clamped at the end of the hook urges the hook to grasp the locking plate in its locked or unlocked position (see FIG. 5), shows in the unlocked position. The lower end of the centering arm of the shackle freely protrudes through the center openings in the plates $o$, $l$, $m$, $n$, $g$, $k$ and ends against the surface of the bottom F. A nut M is the same diameter of the arm and can be screwed in the reduced end of the centering arm to form a locking notch at the shackle (see FIG. 17), that is, the upper surface of the nut always will be adjusted against the under surface of the locking plate $g$. When the plate is in its unlocked position the nut M can go through the center opening of the plate by pulling the shackle, but can not go through when the plate is in its locked position, hence the shackle is held in the locked position.

In the operation of the key-operated device, insert a proper coded key from the key receiving guide at the bottom of the lock as far as it can go, and turn the key in counterclockwise will rotate the guide. The bits of the key will first strike the hook against the tension of the spring $S_2$ and force it to pivot about the mounting stud $y$, and release the locking plate, continued turning of the key will force the locking plate against the tension of the spring $S_1$ to extend and lock the shackle at the nut M, then the hook will return by the tension of the spring $S_2$ and grasp the locking plate in its locked position by its tooth thereon. Turning the key in the clockwise direction will also first force the hook to release the locking plate, then retract the plate, assisted by the tension of the spring $S_1$ to its unlocked position and release the shackle.

Several pairs of coded-keys are given to the user and when any one of them being used is lost, the user can use the remaining one of the same pair to unlock the lock and disassemble it, the lock can be disassembled only when the lock is unlocked, then interchange the mounting order of the above mentioned intermediate plates in accordance with the number of the new coded key which is going to be used and the numbers marked on the plates, and reassemble the lock ready for use. If someone else finds the lost key, and makes the attempt to pick the lock, the said key will be inoperative to the lock.

Whenever interchanging the mounting order of the plates, the nut M at the arm of the shackle must be adjusted up or down to abut against the locking plate before reinstalling into the cup of the bottom F of the lock.

The key-operated mechanisms in type A lock construction can be removed from the bottom opening of the casing after the bottom is disassembled. But in type B lock construction the bottom of the lock is formed integrally with the casing, so that the mechanisms must be picked out from the top opening of the casing after the cap of the lock is disassembled and permutation mechanism removed from the upper part of the body.

The permutation-operated device, referred to above, occupies the upper part of the lock body. The permutation disks as well as the spacing washers, same in thickness, are mounted on the centering arm of the shackle in such a manner that three disks 2, 4, 6 are mounted alternately between the four spacing washers, 1, 3, 5, 7 (see FIG. 17). On the periphery of each washer there is a hole for mounting the screw which fastens the washer to the arm of the shackle thereby. Thus those washers are stationary while the permutation disks are rotatable. Therefore the group of washers and disks can move up or down together with the shackle bodily.

A locking cylinder Q having three locking protrusions $R_1$, $R_2$, $R_3$ on its inside wall (see FIG. 16 at Q) encircles the permutation disks assembly (H at FIG. 17) when they are assembled. The locking protrusions are formed integrally in the cylinder, and alined longitudinally and vertically each other. The distance between the three protrusions are just a little larger than the thickness of the permutation disk, and the length of the protrusions are just a little smaller than the thickness of the spacing washers except the top one of the protrusions $R_1$ which is double in length of the others. The width of the protrusions are just a little smaller than the width of the notches $N_1$, $N_2$, $N_3$ on the peripheries of the permutation disks. With such an arrangement the disks can rotate freely between the spaces of the protrusions, when they are encircled in the locking cylinder. However the cylinder cannot be moved by the friction of any of the disks, because the top locking protrusion $R_1$ double in length as mentioned above is grasped by the notch Y on the periphery of the stationary washer 1 (see FIG. 21). Thus when the disks are driven and rotated, the washers as well as the cylinder will remain stationary with the shackle and, as the shackle is pulled to slide up or down when the permutation disks are lined up with the locking protrusions, the cylinder will remain in its position, because the top edge of the cylinder is bearing against the transfer disk K. When assembled, it will be observed that only the notch Y on the periphery of the washer 1 will slide up and down along the protrusion $R_1$ when the shackle is pulled.

A transfer disk K having protrusions equally spaced around its periphery (see FIG. 19a), is fixed concentrically with the dial I by a hollowed-shaft protruded through the central opening of the cap J for unitary movement. The shaft is the place where the centering arm of the shackle passes by.

A castle-shape permutation-disk-driving cylinder having notches equally spaced around its top periphery and slits cut around its skirt (see L at FIG. 16) is mounted sluggishly and rotatably between the above mentioned cylinder Q and the casing E. The notches of the said cylinder L are made to fit the protrusions on the transfer disk for unitary movement of the dial, transfer disk and the driving cylinder. Any shift in the relationship of the cylinder to the transfer disk by their notches and the protrusion will change the combination of the permutation-operated device. A small tooth $t_4$ protruded from the bottom wall of the driving cylinder is formed integrally with the cylinder and is provided for driving the permutation disks.

There are three driven teeth $t_1$, $t_2$, $t_3$ fastened by the three small screws $p_1$, $p_2$, $p_3$ on the peripheries of the permutation disks respectively, the teeth can be shifted into any one selected cuts, which are provided around the peripheries of the disks (see FIG. 20), for the purpose of adding the changeability of the combination. These cuts on the disks are deeper and narrower than the first mentioned notches $N_1$, $N_2$, $N_3$ on the disks. Thus the locking protrusions $R_1$, $R_2$, $R_3$ of the locking cylinder cannot go by these cuts nor can they interfere with the movement of the teeth $t_1$, $t_2$, $t_3$ on the disks.

In the operation of the permutation-operated device, the motion of the dial I will impart to the permutation-disk-driving cylinder L through the transfer disk K in a unitary movement as described. The tooth $t_4$ at the bottom wall of the cylinder will first strike the tooth $t_2$ and rotate the disk 6, likewise impart the rotation to disk 4 and disk 2 through teeth $t_2$, $t_3$, and $t_1$ accordingly until the notches $N_1$, $N_2$, $N_3$, on the disks are finally in alignment with the locking protrusions $R_1$, $R_2$, $R_3$ on the locking cylinder Q, the shackle can now be pulled and slid upwardly and unlock the lock, wehn the key-operated device is also in the unlocked position. However the shackle can be pulled no further when its off-set arm is clear out the opening in the lug of the casing E, because the top spacing washer 1 mounted on the centering arm of the same shackle serves as a stop to its movement, when it comes against the under surface of the transfer disk K. As soon as the shackle is pulled up, the locking protrusions $R_1$, $R_2$, $R_3$ will fall into the confines of the notches $N_1$, $N_2$, $N_3$ respectively. Thus the rotation of the shackle about its centering arm will not disturb the alignment of the disks, but the disks as well as the locking cylinder Q will rotate with the shackle simultaneously, because the notch Y on the spacing washer 1 grasps the protrusion $R_1$ of the locking cylinder for unitary movement. The disks will still not be disturbed when the shackle is pushed into its locked position. Therefore it is necessary to turn the dial over a complete turn in either direction to disturb the disks purposely to lock the lock.

The cap J as above referred to is mounted freely and rotatably over the hollowed shaft between the dial I and the transfer disk K, and is capable of being removed from the lock body, after the lock is unlocked and the fastening screw $e_1$ is unscrewed, for disassembly or replacement of the parts as well as for varying the locking devices. The connections between the cap and the casing can be L-shaped slots type (see FIGS. 22, 22a, 22b), or threads type (see FIGS. 27, 27a, 28), or flange type (not shown, or any other preferable types, as long as the connections will restrain the cap from turning in one direction and the arm of the shackle will restrain the same from turning in the other direction when the cap is installed in its proper position and the lock is locked. As shown at FIGS. 22, 22a, 22b are the L-shaped slots type, two opposite projections $a'$, $b'$ are formed integrally at the inner side wall of the cap, and two opposite L-shaped slots are cut at the circular edge of the casing. When assembling, the cap is first installed over the top of the casing in such a manner that the longitudinal axis of lug of the cap must be placed offset a certain degree from the longitudinal axis of the lug of the casing, in order to line up the projections $a'$, $b'$ with the openings of the said slots $a$, $b$, push the cap downwardly until the projections $a'$, $b'$ get into the slots $a$ and $b$, then turn the cap in the proper direction until the lug of the cap is lined up and fully matched with the lug of the casing. The slots will act as a stop to the projections and the cap can be turned no further. As soon as the shackle is pushed into the lock and locked, the offset arm of the shackle will bear against the shoulder of the lug of the cap and thus, the cap cannot be turned to loosen in the reverse direction. A small screw $e_1$ is provided to fasten the cap to the casing and prevent it from accidentally becoming loose when the lock is unlocked. To disconnect the cap from the casing a reverse procedure is followed: first, remove the fastening screw $e_1$ and unlock the lock, second, pull the shackle to clear out of the opening in the lug of the casing, third, turn the cap in the opposite direction of that being installed as far as it can turn, then lift the cap off the casing. It will be noted that the dial and the transfer disk as described will be removed together with the cap. The flange and the threads type connections are similar in the mode to the above described, as are the bottom to the casing, therefore it is not necessary for further description.

Several apertures are cut in the side wall of the locking cylinder as well as in the driving cylinder (see L and Q at FIG. 16). The apertures are provided for inspection or checking the combination of the lock. The inspection can be made through the apertures before the permutation-operated mechanism reinstalled into the lock. Also the combination can be varied and tried for opening and locking the mechanism as many times as desired until the new combination has been familiarized and remembered, then put it back into the lock ready for use.

As above mentioned the said permutation-disk-driving-cylinder L installed in the proper position, the slits at the skirt of the cylinder will encircle the cup of the key operated mechanism at the lower end of the lock. The slits are provided for locking the cylinder by the fork-end of the locking plate $g$ of the key-operated device when the device is in its locked position. The fork-end of the plate protrudes through the aperture in the side wall of the cup of the bottom F when the plate is extended as the key-operated device is in its locked position. With such an arrangement the permutation-operated device may be locked either in its locked or unlocked positions. It will therefore be apparent, the lock can be operated by the key-operated device alone when the permutation-operated device is locked in its unlocked position. Likewise the lock can be operated by the permutation-operated device alone when the key-operated device is in its unlocked position. Otherwise the lock must be operated by both a key and the unlocking combination at the same time when the devices are both in their locked position. However, in such case the key-operated device must be first opened before the permutation-operated device can be operated, because the permutation disk locking cylinder is locked by the fork-end of the locking plate of the key-operated device as described. Thus the lock can be selectively locked either by one of the locking devices or by both of them at the same time.

Although the invention is illustrated as being embodied in a padlock, it will be apparent that the invention may, with equal facility, be utilized in other types of locks. It is of course to be understood that although I have described in detail the preferred embodiment of my invention, the invention is not to be thus limited but only insofar as defined by the scope and spirit of the appended claims.

I claim as my invention:

1. A lock comprising a body, a slidable and rotatable shackle having one arm extending centrally into the body, two locking mechanisms having means spaced longitudinally of said arm and coacting individually therewith to retain the shackle in locked position, key operated means controlling the operation of one of said mechanisms, permutation means controlling the operation of the other of said mechanisms, said two mechanisms being constructed and arranged to provide means permitting separate and independent operation of each with the other so that either one is effective to lock and unlock while the other is ineffective.

2. A lock as defined in claim 1 wherein the permutation controlled locking mechanism comprises a plurality of rotatable permutation disks, a rotatable dial for rotating said disks, a member interconnected with said dial for unitary movement therewith, latch means in the key operated locking mechanism interlocking with said member for rendering said dial inoperative to rotate said disks after movement thereof to a predetermined locked or unlocked position.

3. A lock as defined in claim 1 wherein the key controlled locking mechanism comprises a locking plate and a plurality of key receiving plates, the permutation controlled locking mechanism comprises a rotatable dial, a member interconnected to rotate therewith, a plurality of rotatable permutation disks each having a single notch and a plurality of teeth in the periphery thereof, means to interchange the mounting order of the locking plate and key receiving plates to change the key operated locking mechanism, means for shifting the relationship between the dial and member, and means for changing the relationship of the teeth and notches on the permutation disks, either or both of the last two means operating to change the permutation controlled locking mechanism.

4. A lock as defined in claim 3 wherein a transfer disk is fixed to the dial, said member being a rotatable cylinder interconnected with said dial through said transfer disk, and spacing washers fixedly mounted on said arm between alternate permutation disks.

5. A lock as defined in claim 4 comprising a locking cylinder mounted within the rotatable cylindrical member and encircling the permutation disks and washers, protrusions thereon cooperating with the notches in said permutation disks for locking and unlocking the permutation controlled locking mechanism, cooperating means on said locking cylinder and at least one of said washers for holding the locking cylinder stationary while the permutation disks are driven by the rotatable cylindrical member, said means also maintaining the proper relationship between the protrusions and notches when the disks are in the unlocked position whereby the locking arm is free of interference in sliding in and out of the body.

6. A lock as defined in claim 5 wherein said rotatable cylindrical member and said locking cylinder have a plurality of apertures cut in the side walls thereof for checking the correct combination of the permutation operated locking mechanism before it is inserted into the lock body.

7. A lock as defined in claim 1 wherein the key controlled locking mechanism includes a key receiving guide, a plurality of interchangeable key receiving plates of varying thicknesses, a locking plate and a hook mounted therewith, said locking plate and hook being removably and replaceably mounted between any two of said key receiving plates whereby varying coded keys having numerals thereon can be used in accordance with numerals marked on the key receiving plates.

8. A lock as defined in claim 7 wherein said arm has a portion of reduced cross-section area extending through apertures in the locking and key receiving plates, an adjustable member on the end of said arm forming an abutment engageable with said locking plate to limit outward sliding movement of said arm, thereby permitting use of key receiving plates of varying thicknesses.

9. A lock as defined in claim 1 wherein a removable cap serves as a closure for the bottom of said body, said cap enabling said locking mechanisms to abut one another to make the locking action effective when the cap is properly installed and the lock is in locked condition.

10. A lock as defined in claim 9 wherein the connection between the cap and body provides means preventing said cap from turning in one direction and coacting structure between the cap and the other arm of the shackle provides means for preventing rotation of said arm in the other direction.

References Cited
UNITED STATES PATENTS

| | | | |
|---|---|---|---|
| 972,171 | 10/1910 | Dupont | 70—21 |
| 1,001,104 | 8/1911 | Wayda | 70—21 |
| 1,755,521 | 4/1930 | Smith | 70—21 |
| 2,044,529 | 6/1936 | Hite | 70—38 |
| 2,007,142 | 7/1935 | Keil | 70—367X |
| 2,049,416 | 8/1936 | Aldeen | 70—21 |
| 2,090,631 | 8/1937 | Junkune | 70—21X |
| 2,163,852 | 6/1939 | Pond | 70—21 |

RICHARD E. MOORE, Primary Examiner

E. J. McCARTHY, Assistant Examiner

U.S. Cl. X.R.

70—285, 315, 382